UNITED STATES PATENT OFFICE 2,648,622

PURIFYING INSULIN BY SEEDING WITH UNCLUMPED FIBRILS OF INSULIN

David F. Waugh, Watertown, Mass., assignor to Research Corporation, New York, N. Y., a corporation of New York No Drawing. Application November 29, 1950, Serial No. 198,237

5 Claims. (Cl. 167—75)

The present invention relates to methods of purifying insulin.

The manufacture of insulin according to existing methods is a laborious and expensive procedure, the main feature of which is the separation of insulin from extraneous proteins. The separation is effected by selective precipitation followed by final crystallization of insulin, or processes analogous thereto. It is necessary to test for the quantity of insulin at several stages of the process, but since usual chemical and physical tests are unable to distinguish between biologically active insulin and other proteins, it is necessary to conduct biological assays. Various efforts have been made to find unique properties of biologically active insulin by which separation thereof from other proteins might be more readily effected, either for purposes of in vitro assay or for actual preparation of insulin, but so far as I am aware, no such results have heretofore been obtained.

The so-called "heat precipitate" of insulin is well known. I have discovered that it is the end result of a series of changes. Thus, if insulin is heated in acid to about 100° C. for considerable lengths of time, the insulin is largely transformed into fibrils, namely, threadlike particles of submicroscopic size. During the heating, the fibrils tend to clump into floccules which are in spherite form, namely, spherical bodies with a radial orientation of fibrils. With some acids, and especially in the presence of neutral salts, the fibrils tend to clump immediately, as they form, into small spherites. Clumps of spherites constitute the "heat precipitate" as it is usually known. I have discovered that a fibril dispersion (that is, a suspension in which at least a large part of the insulin is in the form of fibrils which are free from one another) can be prepared and is of utmost importance.

I have further discovered that an unusual reaction occurs if any insulin-containing solution is "seeded" with a small quantity of such an insulin fibril dispersion. The fibrils act as nuclei to aggregate biologically active insulin selectively from the solution. The insulin from the solution attaches itself principally to the ends of the fibrils. This action continues with lengthening of the fibrils, until substantially all of the biologically active insulin originally present in the solution has been converted to the fibrous form.

The formation of fibrils from a seeded solution proceeds as a function of the temperature of the solution and the time allowed for fibril growth. That is, for increasing temperatures a correspondingly shorter time is necessary for the substantially complete growth of fibrils from insulin in solution. I have discovered that it is possible to remove insulin from solution by this method over a wide range of temperatures provided that the time allowed for the fibril growth is not long enough to allow any appreciable coagulation of foreign proteins, fats and other materials present in the insulin-containing solution, which would prevent later separation of the insulin fibrils therefrom.

The insulin fibrils may then be separated from other materials by any one of several techniques. Filtration through a fine mesh filter, centrifugation in a high speed centrifuge, or similar methods will suffice. Prior to actual separation, it is frequently desirable to cause aggregation of the fibrils into larger bodies, e. g., spherites, which can be accomplished without precipitation of other proteins. The larger bodies lend themselves well to such mechanical separation methods as filtration and centrifugation.

The separated fibrils represent a high yield of substantially pure insulin, uncontaminated with any foreign protein. It is in a fibrous form, and may then be subjected to further treatment, depending on the use to which it is to be put. The present invention contemplates various methods of further treatment.

According to one procedure, the recovered pure fibrils may be assayed in vitro, with assurance of accuracy because of the absence of foreign proteins. The invention may thus be used as an adjunct to any method of insulin manufacture, whereby the usual biological assays may be reduced in number or entirely dispensed with. Another and more important treatment is based on the fact that soluble insulin may be regenerated from the fibrils by treatment with a suitable reagent, such as an alkali. The invention thus constitutes a method of manufacturing insulin of high purity and of known or readily determined potency. The process is less expensive and results in as high or higher yields than prior methods.

A further procedure involves the re-use of insulin fibrils obtained from an extract solution as a seeding material for further removal of insulin from solution. This process, which will be called back-seeding, allows insulin to be prepared in a continuous process without further introduction of freshly prepared insulin fibrils. Thus the insulin containing extract is introduced in the first stage and regenerated insulin is drawn off as a final product while a portion of the insulin fibrils is recirculated to provide a continuous supply of seeding material.

Other features of the invention will become apparent from the following description of the preferred form of the invention.

General

The invention comprises basically the following steps which will be described in order:

1. Preparation of the "seeding solution," namely, a dispersion of insulin substantially entirely in the form of individual short fibrils.
2. Introduction of the seeding solution into an insulin-containing solution, whereby the fibrils are elongated by aggregation of the biologically active insulin thereon.
3. Separation of the fibrous insulin from foreign matter.
4. Final treatments, as for example, assays, regeneration to soluble form, and back-seeding in a continuous process.

Preparation of seeding solution

As heretofore described, the seeding solution (or rather suspension) comprises insulin which is almost entirely in fibril form. The ability of seeding material to remove insulin from an extract solution at a given temperature is conveniently measured by the aggregating area of the seeding material. The term aggregating area as herein used means the total area of a fibril or suspension of fibrils available for removal of insulin from solution. The aggregating area of a given volume of seeding material will depend on the total number of fibrils and the state of growth of the fibrils in the volume. The amount of aggregating area in a volume of seeding material that is necessary to remove substantially all of the insulin from a given extract solution will depend on the time and temperature relation of the process.

If the process is to be carried on at relatively low temperatures (for example, room temperature) it is best to have a seeding material of high aggregating area so that the removal of insulin by the fibril growth will take place in as short a time as possible. To produce a high aggregating area in the seeding material it is desirable that relatively long fibrils be broken into short segments, since the aggregation of insulin from the seeded solution is chiefly on to the ends of individual fibrils or segments of fibrils; hence the number of ends is made greatest by fragmenting long fibrils to short lengths. The preferred method of preparation is as follows:

A previously obtained insulin solution of high purity is heated in acid to a temperature of about 100° C. Preferably the solution is about 2% insulin dissolved in sufficient hydrochloric acid to give a final pH of about 1.75. I have found that treatment with hydrochloric or hydrobromic acid produces a clear gel of individual fibrils of insulin. Nitric acid has also been found satisfactory. On the other hand, heating insulin in sulphuric acid causes the fibrils to clump immediately, as they form, into spherites. An acid will be chosen, preferably hydrochloric, hydrobromic or phosphoric, which will result in the formation of unclumped fibrils. The heating is continued until substantial fibril formation is indicated, preferably by the appearance of weak flow double refraction. Excessive spherite formation, even with favorable acids, would occur if the heating were continued too long at this time. The solution is then cooled and then quickly frozen in Dry Ice and thawed; the formation of very small ice crystals tends to break up any spherites which may have formed into fibrils, and further breaks the fibrils into short segments. (Any method of applying break-up forces on a sufficiently small scale will serve, as by mechanical grinding.) At this time only a relatively small part of the insulin has been converted to fibril form. If the solution is allowed to stand, additional insulin from the solution will attach itself to the ends of the fibrils, in the same manner as the aggregation of insulin from a seeded solution, as will be later described. The action may be speeded up by heating to 100° C. This results in the formation of long fibrils (of the order of 10,000 to 20,000 angstrom units long and 100 to 200 angstrom units wide). These fibrils may be mainly oriented in one direction by flow. By quickly freezing (at Dry Ice temperatures) and thawing such a preparation of long fibrils in two or three cycles, without allowing the temperature to rise much above 0° C., the fibrils are broken up by the ice crystals into short lengths, averaging about 2000 angstrom units.

The dispersion should be used for seeding as soon as possible after preparation, since the short fibrils tend to aggregate into longer ones and thus diminish the activity of the seeding material. Heating should also be avoided, not only to minimize aggregation of the short fibrils into long ones but to prevent fibrils from clumping into spherites, in which the number of available "ends" to serve as nuclei would be further reduced.

The foregoing method of preparing seeding material may advantageously be followed to obtain short, active fibrils which are most useful for initial seeding, for seeding at lower temperatures, and for assaying. For actual production of satisfactory yields of insulin, however, the method of back-seeding, which will be described hereinafter, will usually be preferable.

Seeding

An insulin-containing solution is now seeded with one of the materials described above. The process may be applied to any insulin solution, usually a semi-purified solution resulting from one of the primary extractions of pancreatic tissue. For example, the starting material may be the insulin-containing liquor resulting from the concentration of the first acid-alcohol extraction of the pancreas. This starting material contains a considerable quantity of foreign protein, and it is the object of the invention to separate substantially pure insulin therefrom.

The conditions of salt concentration, pH, dielectric constant and other factors should be adjusted to provide for rapid aggregation of insulin onto the fibrils while avoiding excessive spherite formation and alterations in the properties of extraneous proteins. The exact conditions depend upon the purity and nature of the insulin solution to be seeded but in general the pH should be below 3.0 (preferably between 0.5 and 2.0) and the salt concentration and dielectric constant should be adjusted to keep extraneous proteins in solution. The temperature of the solution and the time allowed for fibril growth after seeding must be adjusted so that a substantial amount of insulin is removed from solution before any appreciable quantity of foreign proteins begins to coagulate.

The temperature may be kept low (for example, room temperature) and fibril growth may be allowed to take place until substantially all of the insulin in solution has been removed. For example, a freshly prepared seeding material of high aggregating area containing fibrils equivalent to about one-tenth the amount of insulin in solution may be used satisfactorily to seed an insulin solution at low temperatures. At 25° C. substantially all of the native insulin in a 2% solution is converted to fibrous form in about 96 hours.

At higher temperatures, the reaction proceeds more rapidly and temperatures well above 25° C. may be used provided that the reaction is stopped before any appreciable amount of foreign proteins begins to coagulate.

At higher temperatures, for example 50° C. or above, the reaction proceeds rapidly enough so that it is no longer necessary that the seeding material be of such a high aggregating area. In effect, this means that longer seeding fibrils may be used for seeding and the procedures of obtaining very short fibrils by freezing and thawing the seeding material or otherwise mechanically breaking the fibrils into short segments may be dispensed with. For a given temperature of the reaction, it is only necessary that a substantially complete removal of insulin from solution will take place before the time at which foreign proteins begin to coagulate.

Temperatures near 100° C. may be used with some solutions. Under these conditions it is possible for insulin fibrils to form without seeding, but the fibril growth process will not be completed before excessive foreign protein coagulation has occurred. The introduction of a seeding material substantially reduces the reaction time necessary so that the reaction may reach completion before any coagulation of foreign proteins takes place. For example, at 80° C. insulin may be removed in fibril form without previous seeding in a matter of 8 hours. The addition of a seeding material at this temperature allows the fibrilation to go to completion in a matter of 60 minutes at which time the reaction may be stopped. At 100° C. a fibril formation time of 30 minutes without seeding may be reduced to 4 minutes with seeding.

During the fibril-forming action, the molecules of native insulin attach themselves to the active fibrils of the seeding material, thus disappearing from solution. This growth process takes place chiefly at the ends of the fibrils in such a way that the ratio of the length of fibril to the diameter of the fibril remains approximately constant. If a long fibril is broken into shorter segments, each segment grows in length while maintaining a relatively constant diameter until it becomes as long as the original fibril and after that grows so as to maintain an approximately constant ratio of length to diameter. The fibril growth reaction will usually proceed until over 98% of the insulin of the original solution is converted to fibrils. The individual fibrils, as shown by flow double refraction and the electron microscope, may attain length well over 20,000 angstrom units. When fibrils reach lengths much greater than this they become mechanically unstable and any stress on a fibril due to flow of the solution or agitation may cause the fibril to break into shorter segments. The fibril growth proceeds without affecting or being affected by the foreign proteins present in the original solution as long as the temperature, time and other conditions as set forth above are properly considered.

The effects of time and temperature will, in general, be understood from the foregoing description, although no exact and complete relation can be given. At 100° C., a heat precipitate will form spontaneously, that is, without seeding, but usually such a long time will be required that any foreign protein that may be present will coagulate before a satisfactory yield can be obtained. At much lower temperatures, say 25° C., a precipitate will not form spontaneously. Seeding, as described above, enables conversion of insulin to fibril form at temperatures below those at which spontaneous precipitation can occur, and at higher temperatures, it materially accelerates the process of fibril-formation, so that the reaction can proceed to completion without hindrance by any substantial coagulation of foreign protein.

Whatever time and temperature conditions are followed, the insulin in aggregated form is then to be separated from the other proteins and materials in the solution.

*Separation*

The fibrous insulin may be separated from the solution by various methods, preferably mechanical, as by high speed centrifugation or filtering. In all methods conditions of acidity, salt concentration, temperature, dielectric constant and other factors should be adjusted to prevent precipitation of extraneous protein or the adsorption of extraneous protein onto the insulin fibrils, as will be understood by those skilled in this art. Conditions must be chosen which do not cause a reversion or breakdown of the fibrils to a soluble state, nor a change of the insulin into a permanently biologically inactive form. Since insulin fibrils are stable up to pH's substantially above 11.0 and are not chemically affected by a wide variety of customary reagents such as salts, alcohols and acids, the foregoing conditions of separation are readily met.

Mechanical separation may be enhanced by first clumping the fibrils into larger particles, e. g., spherites. This is accomplished by the addition of sulphuric acid or neutral salts. The formation of spherites is accelerated by heating, as heretofore noted, but temperatures which would precipitate foreign protein are to be avoided.

The primary separation may then be followed by washing of the separated fibrils with a suitable solvent which will dissolve the extraneous proteins leaving the fibrils unaffected as, for example, dilute acid containing salt.

The material separated from the solution is substantially pure fibrillar insulin, namely, insulin in the form of insoluble fibrils.

*Regeneration*

The uncontaminated fibrous insulin may be regenerated to soluble form. In general the regeneration step involves treating with an alkali.

The washed fibril suspension may first be frozen and thawed or otherwise mechanically homogenized to break up fibrils to shorter lengths. This is done mainly because the alkali acts on the ends of the fibrils; thus the conversion to soluble form is virtually a reversal of the actions involved in the formation of the fibrils. Where alkali of sufficient strength is used the above step of breaking up the fibrils may be omitted.

The final fibril suspension, whether or not subjected to breaking-up treatment, is now made alkaline, for example by adding 2 N sodium hydroxide to give a final 0.04 to 0.4 N solution. The time of the regeneration process is also affected markedly by temperature, as well as by the type of alkali used and the concentration of alkali. Thus, at 0° C., 0.03 N sodium hydroxide requires about an hour substantially to complete the process. At 15° C. a time of 10 to 15 minutes is found satisfactory. Higher temperatures are generally to be avoided, because of the possibility of inactivation of the regenerated insulin in the presence of alkali. The solution may then be neutralized to about pH 8.0 with acetic acid. At this pH the regenerated insulin remains in solution and may be separated from the unregenerated fibrils by filtration or centrifugation. The filtrate or supernatant, containing soluble native insulin, may be neutralized further to the isoelectric point and the insulin centrifuged off and dried or otherwise handled. Since all of the fibrils are not disaggregated by the alkali, the unregenerated fibrils are preferably returned to a preceding stage of the process; thus they may be used as seeding material, or mixed with the impure starting material.

The regenerated insulin is the end product of the process and represents a high yield of exceptional purity, obtainable with far less difficulty than by prior methods. The regenerated insulin may, if desired, be crystallized. However, it is one of the advantages of the present invention that no crystallization procedures are necessary for separation of insulin from foreign matter. The insulin, obtained as described above, may be used directly for therapeutic or other purposes.

*Assaying*

The present invention is also applicable to the in vitro assaying of insulin. A sample of pure insulin fibrils washed free of nitrogen-containing salt and other proteins, may be assayed quantitatively by measuring the nitrogen content, by drying the fibrils and measuring their increase in weight, or by any other suitable method. In vitro assays have usually been unavailable to insulin preparations for various reasons, notably the inability to obtain accurately measured small quantities of insulin free of other proteins and nitrogen-containing salts. The usual physical and chemical methods are ineffective to distinguish between insulin and other nitrogen compounds in the same solution or coagulum.

According to this feature of the present invention, the assay may be used as an adjunct to any process of insulin preparation. A sample of pure insulin, or a sample of impure insulin withdrawn from the manufacturing process at any stage, is used as the "starting material" for the assay. This starting material is seeded with a small quantity of short active fibrils, preferably freshly prepared from a pure insulin solution, and the resulting elongated fibrils are separated in the manner heretofore described, and washed free of salt. In any case, whether the sample is pure insulin or an impure solution, the biologically active insulin originally present in the sample is converted into fibrils of pure insulin. It is now possible to make an accurate measurement of the amount of insulin in the starting material by any one of several techniques. Thus a determination by nitrogen content may be made with the assurance that the measurement gives the nitrogen content of the insulin alone, or the fibrils may be dried and weighed to measure the insulin present in the starting material. It is unnecessary to regenerate the fibrils to soluble form, since the assay may be conducted on the fibrous insulin.

The assay may therefore be used to indicate insulin potency at any stage of the manufacturing process; thus much of the expense and uncertainty of biological assays may be avoided.

*Back-seeding*

The foregoing description shows how pure soluble insulin may be prepared according to the principles of the present invention. This process has been described in the steps of preparation of seeding material, seeding, separation, and regeneration with the added technique of assaying at any point in the process. The invention further contemplates the production of insulin by the step of back-seeding in a continuous and complete process.

According to the methods described above the final material, before regeneration, is a mass of fibrils. This mass is separated from the other materials and washed to produce a pure fibril mass which is subsequently to be regenerated to soluble form. The step of back-seeding consists of removing fibrils from one step of this process and using these fibrils as seeding material for treatment of more extract solution. Several alternative procedures for back-seeding are possible. Thus a portion of the unpurified fibril mass may be removed at that stage of the process, and agitated or homogenized if necessary to break the mass into small fibril segments, which are then used as seeding material. An alternative procedure is to purify the fibrils by separation and washing, break the fibrils into shorter segments by homogenization or other means and use this material for seeding. The fibrils may be purified after removal from the main process, or alternatively a portion of the fibrils may be taken from the main process after purification.

As noted above the exact requirements of the seeding material with regard to the aggregating area of the fibrils will be determined by the concentration of the extract solution, the temperature at which the reaction is to take place, and the time allowed for removal of the insulin from solution by fibril growth. The requirements on the seeding material, in turn, determine the procedures necessary in the back-seeding stage of the process to produce such a seeding material.

For purposes of assaying, however, it has been found desirable to use a seeding material freshly from the final pure insulin solution according to the treatment heretofore described, since the assaying conditions may be more precisely maintained with freshly prepared fibrils than with those obtained as a result of the process of manufacture of insulin.

*Conclusion*

From the foregoing description it will be seen that according to the present invention the biologically active insulin is converted to a unique form, which renders it separable from foreign protein. The insulin fibrils, being themselves relatively insoluble, and hence not biologically active, may be considered potentially biologically active, since their conversion to biologically active form is readily effected.

As heretofore noted, the various steps of treating the insulin can be carried out without precipitating or coagulating foreign proteins. This is important not only in that the insulin may be readily separated, but also in that other proteins are not affected in a way that would prevent their subsequent recovery. Pancreatic tissue is valuable for proteins other than insulin, but prior methods of insulin preparation sometimes require a sacrifice of other useful proteins. In the method of the present invention, any suitable methods of protein recovery are available after separation of the insulin.

It will be understood that although I have described the preferred embodiment of my invention, the invention is not to be considered as limited to the precise steps herein described, but may be varied within the scope of the appended claims.

This application is a continuation-in-part of my copending application Serial No. 705,820 filed October 25, 1946, now abandoned.

Having thus described the invention, I claim:

1. A method of obtaining insulin which consists in introducing into a solution containing insulin and foreign protein and having a low pH in the acid range a seeding material of unclumped insulin fibrils, maintaining the seeded solution for a time much shorter than that which would be required for complete precipitation of insulin from an unseeded solution at the temperature of the seeded solution, whereby no more than a minute amount of coagulation of foreign protein occurs and the insulin from the sollution is aggregated on the seeding material by elongation of the fibrils, and separating the aggregated insulin from the solution.

2. In the method of claim 1, the additional step of regenerating the insulin fibrils resulting from the method of claim 1 to native soluble form by treatment with a material having a weak alkaline reaction at low temperature.

3. In the method of claim 1, the additional step of adding a portion of the final aggregated insulin obtained as the product of claim 1 in fibril form as seeding material for precipitation of insulin from another solution of insulin and foreign protein.

4. A method of obtaining insulin which consists in introducing into insulin-containing solution having a low pH in the said range and at temperature below that at which a heat precipitate of insulin will form spontaneously a seeding material comprising a dispersion of active unclumped fibrils of insulin, allowing the solution to stand for a sufficient time to cause aggregation of insulin from the solution on the fibrils as nuclei, and separating the insulin fibrils from the solution.

5. A method of obtaining insulin which consists in introducing into a solution of insulin and foreign protein a seeding material comprising a dispersion of short active insulin fibrils, the solution being acidified to cause insulin to aggregate on the fibrils, the solution being maintained at a temperature sufficiently low to prevent coagulation of foreign protein, and separating the insulin fibrils from the solution.

DAVID F. WAUGH.

References Cited in the file of this patent

Waugh: J. A. C. S., February 1946, pages 247 to 250.

Waugh: Federation Proceedings, February 1946, page 111.

Waugh: in Journal Americal Chemical Society, page 663, April 1944.

Lens: in J. Biol. Chem., July 1947, volume 169, pages 313 to 322.